United States Patent [19]

Capello et al.

[11] Patent Number: 4,471,519
[45] Date of Patent: Sep. 18, 1984

[54] METHOD FOR MUTUALLY FIXING VEHICLE BODY ELEMENTS

[75] Inventors: Franco Capello, Turin; Carlo Audenino, Trofarello, both of Italy

[73] Assignee: Fiat Auto S.p.A., Turin, Italy

[21] Appl. No.: 416,105

[22] Filed: Sep. 9, 1982

[30] Foreign Application Priority Data

Sep. 14, 1981 [IT] Italy ................ 68203 A/81

[51] Int. Cl.³ .......................... B23P 3/00; B23P 19/04
[52] U.S. Cl. ........................................ 29/460; 156/292; 156/307.3; 156/307.7; 219/91.2; 228/175; 296/210
[58] Field of Search .................. 29/460, 458; 296/210; 219/86.1, 91.2; 156/292, 307.3, 307.7; 228/175, 214

[56] References Cited

U.S. PATENT DOCUMENTS

| | | | |
|---|---|---|---|
| 2,466,366 | 4/1949 | Braun | 296/210 |
| 2,576,354 | 11/1951 | Oswald | 296/210 |
| 2,641,674 | 6/1953 | Orr et al. | 219/91.2 |
| 2,746,789 | 5/1956 | Ridgway | 219/91.2 X |
| 2,965,530 | 12/1960 | Stamm et al. | 156/307.7 X |
| 3,008,760 | 11/1961 | Barenyi | 296/210 |
| 3,112,952 | 12/1963 | Barenyi | 296/210 |
| 3,239,269 | 3/1966 | Wilfert et al. | 296/210 |
| 3,387,356 | 6/1968 | Clark | 228/175 X |
| 3,526,954 | 9/1970 | Katz et al. | 228/175 |
| 4,352,003 | 9/1982 | Arnoldt | 219/91.2 X |

FOREIGN PATENT DOCUMENTS 1278557 10/1961 France ................ 296/210

Primary Examiner—Charlie T. Moon
Attorney, Agent, or Firm—Michael N. Meller

[57] ABSTRACT

A process for fixing the roof to a bearing structure of the body of a vehicle, in which the roof is mounted in contact with a bead of an adhesive substance applied onto an inner rim of the bearing structure, and an outer rim of the roof is fixed by welding to an outer rim of the bearing structure, the body thus obtained being subsequently baked at a predetermined temperature for a period of time sufficient to polymerize and harden the said adhesive substance.

9 Claims, 3 Drawing Figures

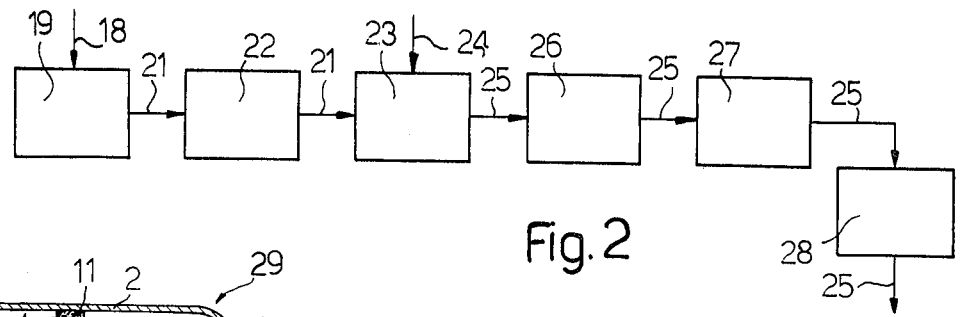
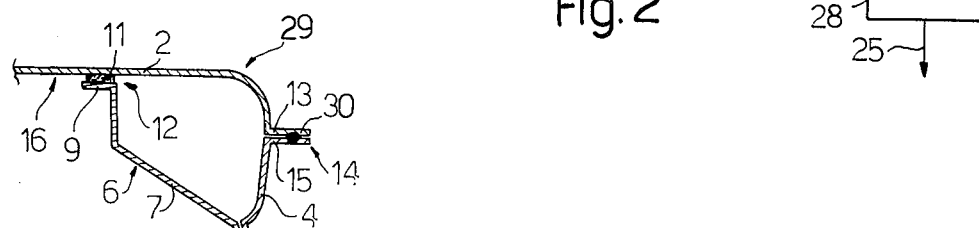
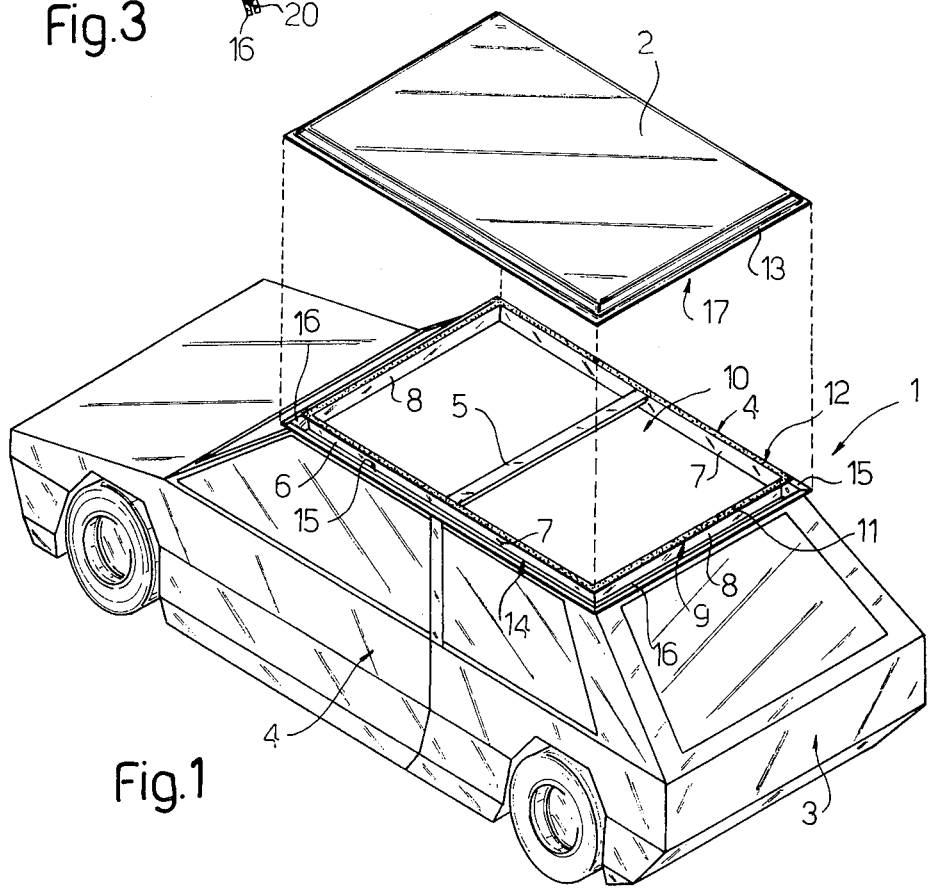

METHOD FOR MUTUALLY FIXING VEHICLE BODY ELEMENTS

BACKGROUND OF THE INVENTION

The present invention relates to a process for fixing vehicle body elements to each other.

In particular, the present invention relates to a process for fixing the body roof to the remaining elements of the body (bearing structure) previously assembled by known processes.

The invention also relates to a vehicle body obtained by the said process.

It is known that to confer to the vehicle body a sufficient mechanical resistance it is necessary for the body to be stiffened at the connection rim connecting the roof to the sides and to the respective connection crossbars of these latter. This stiffening is obtained by providing within the body, at the said rim, a box-type structure, by means of bent elements of plate which are spot welded to each other and/or to the sides, the front and rear crossbars and the roof.

This solution has some disadvantages. In the case of a roof which is not part of the box-type structures, these latter are obtained by sequentially welding a plurality of bent elements to the sides and to the front and rear connection crossbars prior to assembly of the roof; accordingly, the process of assembling the roof and the respective body stiffening structures renders it necessary to provide numerous weld beads. In particular, to obtain completely closed box-type structures having the maximum torsional stiffness, at least four weld beads are necessary, namely, three for forming the box-type structure and a fourth bead for fixing the roof to the remaining elements of the body. This involves high production costs and long working times.

In the case, instead, of box-type structures which are integrated with the roof, two weld beads only are necessary, inasmuch as said structures are obtained by means of a single bent frame-shaped element lap welded to the sides together with the roof, at one bent rim of this latter, by means of a common weld bead.

However, this process requires the use of joints outside the vehicle, which result in being esthetically unattractive, and above all it requires applying onto the joints waterproofing adhesives and/or fluidtight mouldings in order to prevent the joints from becoming quickly corroded.

SUMMARY OF THE INVENTION

The object of the present invention is to provide a process for fixing the vehicle roof to the bearing structure of the body, which will be free from the above disadvantages.

This object is attained by the present invention which relates to a process for fixing the roof to a bearing structure of the body of a vehicle, characterized in comprising:

a first stage of applying a bead of an adhesive plastic substance, of determined thickness, onto the inner rim of said bearing structure, facing the said roof and delimiting the upper space of the said bearing structure, which space is apt to be closed by the said roof;

a second stage of mounting the said roof onto the said bearing structure, a lower surface of the said roof being brought into contact with the said bead of adhesive substance, and an outer rim of the said roof being positioned in a position facing an outer rim of the said bearing structure, disposed outside the said space;

a third stage of welding the said outer rim of the said roof to the said outer rim of the said bearing structure, said third stage being carried out by means of electrical spot welders; and a fourth stage of baking the said body at a predetermined temperature for a period of time sufficient to allow the polymerization and the hardening of the said adhesive plastic substance.

BRIEF DESCRIPTION OF THE DRAWINGS

For a better understanding of the present invention an embodiment thereof will now be described by way of non limitting example, with reference to the annexed drawing, in which:

FIG. 1 is a view showing diagrammatically a vehicle body formed in accordance with the process of the present invention;

FIG. 2 is a block diagram of a process for working the body shown in FIG. 1, incorporating the process of the present invention; and FIG. 3 is a cross-sectional view of a portion of the body shown in FIG. 1.

DETAILED DESCRIPTION OF THE INVENTION

Referring now to FIG. 1, the process according to the present invention is utilized for mutually fixing to each other elements of a vehicle body 1, namely, the roof 2 and the bearing structure 3 of the body 1. Structure 3 comprises two sides 4 connected to one another by crossrods 5 (some of which are not shown) and by a substantially frame-shaped reinforcing element 6 of the body 1, welded to the two sides 4.

Element 6 comprises two longitudinal members 7 welded each to a respective side 4 by means of electrical spot welders, and two connection crossrods 8 which rigidly connect the longitudinal members 7 and the respective sides 4. Conveniently, element 6 is obtained by pressing it in one piece, but it may also be composed of a plurality of elements welded to each other.

Element 6 has an inner rim 9 substantially flat in shape, delimiting an upper space 10 of the structure 1 and bent towards the interior of the said space 10. The said rim 9 is coated, during one of the stages of the process according to the present invention, with a layer 11 of an adhesive substance, for example a synthetic plastic of suitable viscosity, so as to form an adhesive resin bead 12 facing the roof and apt to close the space 10.

The roof 2 is provided with an outer lower rim 13 which is disposed (see FIG. 3), during a further stage of the process of the invention, in a position facing an outer upper rim 14 of the bearing structure 3, located outside the space 10 and parallel to the rim 9. In the embodiment shown in FIG. 1, the outer rim 14 comprises respective upper rims 15 of the sides 4 and respective bent rims 16 of the crossrods 8 of the element 6. Rims 16 continue without gaps, but with a different inclination, also on the longitudinal members and are used to fix these latter to the sides 4. The roof 2 is further provided with a lower surface 17 facing the rim 9.

In FIG. 2 there is shown a block diagram illustrating a possible process for fixing the roof 2 in accordance with the present invention.

A flow 18 of body elements, such as the sides 4, the crossrods 5 and the reinforcing elements 6, is supplied to a first welding station 19 at which the various elements of the body 1, except the roof 2, are assembled by methods which are already known and therefore are not described herein, and are welded to each other by spot welds 20 (FIG. 3). Coming from the station 19 is a flow 21 of bearing structures 3 which is conveyed to a second station 22 in which each structure 3 is subjected to a first stage of the process according to the present invention.

At the station 22 a bead 12 of an adhesive substance 11 is deposited, manually or by means of automatic machines, all along the inner rim 9, the said adhesive substance being formed, for example, by a mixture of epoxy and/or vinyl resins. Bead 12 has a predetermined thickness which on the average is comprised in a range from 1.5 to 3 mm and which in any case does not exceed the value of 4 mm.

It has been proved that the best thickness for the bead 12 would be about 1/10 of mm, but such thickness cannot be used at present because of the large working tolerances of the body which give rise to clearances in the order of 1÷3 mm between the rim 9 and the roof 2. The application of the beads 12 is carried out conveniently by extrusion of a band of adhesive substance 11 from at least one nozzle mounted on a movable arm (not shown) which is moved along the perimeter of the space 10. The bead 12 may be either continuous or formed by separate sections of predetermined length disposed in the more stressed regions. In any case, the viscosity of the substance 11 is very high and is comprised in the range between 500,000 and 1,000,000 centiposes (cP) (Brookfield viscosity) so as to ensure its adherence to the rim 9.

After the said first operation, the flow 21 of bearing structures 3 is supplied to a third station 23 to which also a flow 24 of body elements formed by the roofs 2 is supplied. At the station 23 there is carried out a second stage of the process according to the present invention, consisting in positioning the roof 2 onto the bearing structure 3, so as to close the space 10. The mounting of the roof is carried out manually, or automatically by means of manipulators provided with suitable reference marks and with an automatic control unit. In any case, the roof 2 is positioned in such a manner that its lower surface 17 adheres perfectly to the inner rim 9. The surface 17 is brought to contact the bead 12 in every point of this latter, taking care that no air bubbles remain between the adhesive substance 11 and the surface 17. Moreover, the outer rim 13 of the roof 2 is disposed in a position facing the outer rim 14 of the structure 3, so as to rest on the rim 14 itself.

Thereafter, a flow 25 of bodies 1 is supplied from the station 23 to a fourth station 26, at which a third stage of the process of the present invention is carried out, which consists in welding the rim 13 to the rim 14 by means of electrical spot welders. This stage also may be carried out manually or automatically by means of robots controlled by a processing unit.

Successively, the flow 25 of bodies 1 is supplied, sequentially, to respective stations 27 and 28 at which a phosphating treatment and a painting treatment of each body 1 are carried out, respectively. These treatments are known and therefore they are not described herein.

Finally, the flow 25 of bodies 1 is supplied to a successive working line, not shown, for mounting the mechanical members of the vehicle onto each body 1.

As is known, the painting treatment can be carried out in many ways, e.g. by applying a coat of paint by electrophoresis, an undercoat of powder and a coat of enamel (classic process), or by applying an undercoat of powder, a coat of paint by electrophoresis and a coat of enamel. Whatever type and succession of coats of paint are used, after each coat or at the end of the painting, the body has to be subjected to a baking stage which fixes on it the layers of paint applied thereon.

Therefore, at the station 28 at least one baking operation of each body 1 of the flow 25 is carried out, thus obtaining the fixing of the paint on the body 1 and simultaneously carrying out a fourth stage of the process of the invention. In fact, the baking of the bodies 1, carried out at the station 28 in special furnaces of known type at a predetermined temperature of nearly 200° C., gives rise to a crosslinking of the adhesive substance 11 and, consequently, its hardening.

The time of the treatment depends on the type of adhesive substance 11 and continues till complete hardening of the said substance. Thanks to this treatment, the roof 2 results in being rigidly connected to the inner rim 9, and therefore around the space 10 a stiffening box-type structure 29 is created (see FIG. 3) which comprises the reinforcing element 6, a section of the sides 4 and the portion of body 2 which is comprised between the rims 9 and 14, to which the body 2 is rigidly fixed thanks to the polymerized adhesive substance 11 and to weld spots 30, respectively. The box-type 29 behaves as a continuous structure as regards the distribution of the stresses, and therefore it exhibits a high torsional stiffness. The bead 12 can transmit maximum stresses comprised between 50 and 200 kg/cm$^2$ after an average time of baking of about 30 minutes. Moreover, it keeps a minimum of elasticity even after the baking.

It has been proved by experimental tests that in consequence of the fixing of the roof 2 by means of the process of the present invention, the torsional stiffness of the body 1 considerably increases relative to bodies which are welded only. Moreover, the vibrations and the production of noise during the teste decrease thanks above all to the elasticity of the bead 12 and to the better distribution of the stresses which this latter, being continuous, allows in respect of a spot weld bead. In addition, the provision of the bead 12 results in being more economical and more rapid than the provision of a spot weld bead and allows to fix the roof 2 without using joints outside the vehicle.

It is clear that variations and modifications can be made to the process described hereinabove, without departing from the scope of the present invention. In particular, the fourth stage of the process of the present invention may be carried out upstream of the stations 27 and 28, at a special baking station for the bodies 1. In this case, the baking serves only to produce the crosslinking of the substance 11, while for fixing the paint a subsequent baking will be carried out at the station 28.

We claim:

1. A process for fixing the roof (2) to a bearing structure (3) of the body (1) of a vehicle, characterized in comprising:

a first stage of applying a bead (12) of an adhesive plastic substance, (11), of determined thickness, onto an inner rim (9) of the said bearing structure (3), facing the said roof (2) and defining an upper space (10) of the said bearing structure (3), which space is closed by the said roof (2);

a second stage of mounting the said roof (2) onto the said bearing structure (3), a lower surface (17) of the said roof (2) being brought into contact with the said bead (12) of adhesive substance (11), and an outer rim (13) of the said roof (2) being positioned in a position facing an outer rim (14) of the said bearing structure (3), disposed outside the said space (10);

a third stage of welding the said outer rim (13) of the said roof (2) to the said outer rim (14) of the said bearing structure (3), the said third stage being carried out by means of spot welders; and a fourth stage of baking the said body (1) at a predetermined temperature for a period of time sufficient to allow the polymerization and the hardening of the said adhesive substance (11).

2. A process according to claim 1, characterized in that the said first stage is carried out by extrusion of a band of the said adhesive substance (11) from at least one nozzle mounted on an arm movable along the perimeter of the said space (10).

3. A process according to claim 1, characterized in that the said bead (12) has a thickness from 1.5 to 4 mm.

4. A process according to claim 1, characterized in that the said plastic adhesive substance (11) has a viscosity Brookfield between 500,000 and 1,000,000 centiposes (cP).

5. A process according to claim 1, characterized in that the said bead (12) of said plastic adhesive substance (11) is continuous and completely covers the said inner rim (9) of the said bearing structure (3).

6. A process according to claim 1, characterized in that the said fourth stage is carried out, simultaneously with the baking of layers of paint applied onto the said body, at a painting station (28) situated downstream of a respective phosphating station (27).

7. A process according to claim 1, characterized in that the said fourth stage is carried out at a baking station situated upstream of respective phosphating and painting stations (27 and 28, respectively) for the said body (1).

8. A process according to claim 1, characterized in that the the said predetermined baking temperature is nearly 2000° C.

9. A process according to claim 1, characterized in that the said fourth stage has an average duration of about 30 minutes.

* * * * *